US010921931B2

(12) United States Patent
Sugiyama

(10) Patent No.: US 10,921,931 B2
(45) Date of Patent: Feb. 16, 2021

(54) TOUCH INPUT SYSTEM

(71) Applicant: SHARP KABUSHIKI KAISHA, Sakai (JP)

(72) Inventor: Koichi Sugiyama, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/598,476

(22) Filed: Oct. 10, 2019

(65) Prior Publication Data

US 2020/0117333 A1 Apr. 16, 2020

(30) Foreign Application Priority Data

Oct. 15, 2018 (JP) .............................. JP2018-194293

(51) Int. Cl.
G06F 3/041 (2006.01)
G06F 9/54 (2006.01)
G06F 3/0354 (2013.01)
G06F 3/044 (2006.01)

(52) U.S. Cl.
CPC ...... *G06F 3/04164* (2019.05); *G06F 3/03545* (2013.01); *G06F 3/044* (2013.01); *G06F 9/542* (2013.01)

(58) Field of Classification Search
None
See application file for complete search history.

(56) References Cited

U.S. PATENT DOCUMENTS

2001/0035855 A1* 11/2001 Komatsu ............... G06F 3/0488
345/156
2001/0036318 A1* 11/2001 Komatsu ............. G06F 3/04883
382/202
2002/0041272 A1* 4/2002 Ohashi .................... G06F 3/046
345/173

FOREIGN PATENT DOCUMENTS

JP 2001-265513 A 9/2001

* cited by examiner

*Primary Examiner* — Ifedayo B Iluyomade
(74) *Attorney, Agent, or Firm* — ScienBiziP, P.C.

(57) ABSTRACT

A touch input system includes: a coordinate detector that detects a position coordinate of a touch with a pen on a board; a pen identifying part that identifies an attribute regarding the pen; a first pen-state determiner that determines whether the pen is in a state where the coordinate detector is able to detect the position coordinate; a second pen-state determiner that determines whether the pen is in a state where the pen identifying part is able to identify the attribute; and a notifier that notifies predetermined information based on determination results of the first pen-state determiner and the second pen-state determiner.

20 Claims, 14 Drawing Sheets

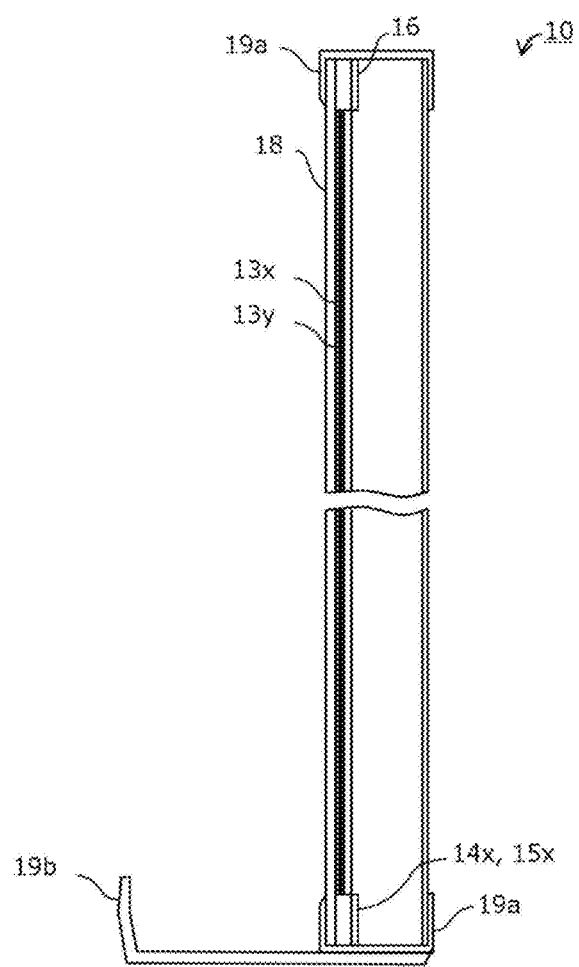

FIG. 6A

| IDENTIFIER TYPE | f0 (kHz) | WRITING COLOR |
|---|---|---|
| ID1 | 100 | BLACK |
| ID2 | 120 | BLUE |
| ID3 | 140 | GREEN |
| ID4 | 160 | YELLOW |
| ID5 | 180 | ORANGE |
| ID6 | 200 | RED |

FIG. 6B

| IDENTIFIER TYPE | f0 (kHz) | WRITING COLOR | THICKNESS OF NIB | SHAPE OF NIB |
|---|---|---|---|---|
| ID-a | 100 | BLACK | THIN | ● |
| ID-b | 105 | BLACK | THIN | ■ |
| ID-c | 110 | BLACK | THICK | ● |
| ID-d | 115 | BLACK | THICK | ■ |
| ID-e | 120 | BLUE | THIN | ● |
| ID-f | 125 | BLUE | THIN | ■ |
| ID-g | 130 | BLUE | THICK | ● |
| ID-h | 135 | BLUE | THICK | ■ |
| ID-i | 140 | GREEN | THIN | ● |
| ⋮ | ⋮ | ⋮ | ⋮ | ⋮ |
| ID-u | 215 | RED | THICK | ● |

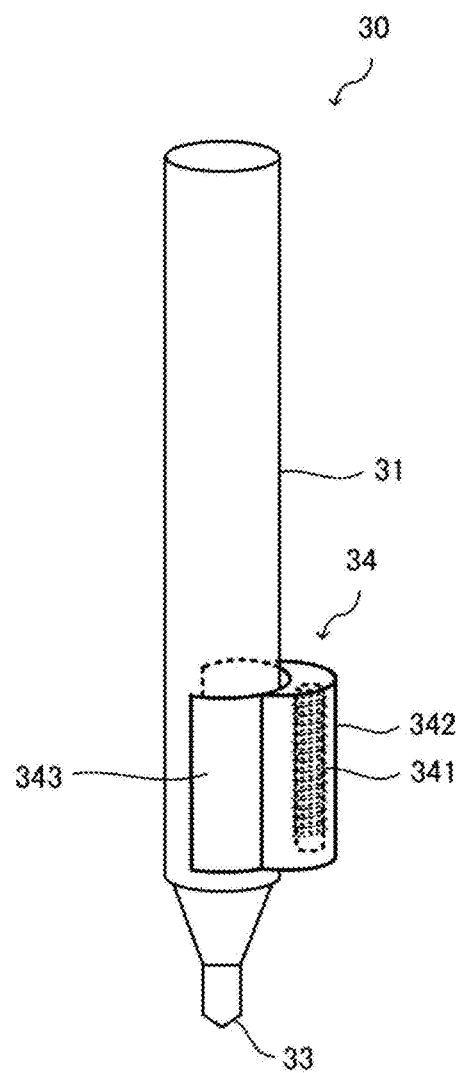

TOUCH INPUT SYSTEM

INCORPORATION BY REFERENCE

This application is based upon and claims the benefit of priority from the corresponding Japanese Patent Application No. 2018-194293 filed in Oct. 15, 2018, the entire contents of which are incorporated herein by reference.

BACKGROUND OF THE INVENTION

Field of the Invention

The present invention relates to a touch input system for input to an input screen for touch input with an input tool.

Description of the Background Art

There has been wide use of input devices for writing input to a touch input screen using an electronic pen.

For example, Japanese Unexamined Patent Application Publication No. 2001-265513 discloses a coordinate reading device that detects the position of an electronic pen on an electronic board by using an electromagnetic induction method. In the coordinate reading device, a power supply coil is incorporated in the electronic pen, and a high-frequency voltage is applied to multiple loop coils disposed on the back surface of the electronic board and extending in the vertical and the horizontal directions. An electromotive force is generated in the power supply coil of the electronic pen due to electromagnetic induction, and an alternating electric field is generated from the electronic pen. The alternating electric field is detected by the loop coils of the electronic board to detect the position of writing input.

As described above, in the electronic pen (input tool) according to the background art, it is possible to detect the position of writing input. However, in a situation where writing input is made using multiple types of electronic pens (input tools), it is difficult to determine the type of each electronic pen (input tool).

When some problem occurs in the electronic pen (input tool), it is assumed that the input with the electronic pen (input tool) and the determination on the type of electronic pen (input tool) is impossible or inaccurate. If the user gives input with the electronic pen (input tool) without being aware of such a faulty state of the electronic pen (input tool), it is assumed that the input information that is supposed to be input by the user is not correctly input in this situation. Unfortunately, with the input device according to the background art, it is difficult to determine the state of the electronic pen (input tool) and to notify the user of the state of the electronic pen (input tool), and therefore the above situation is not preventable.

An object of the present invention is to provide a touch input system capable of determining the type of input tool, determining the state of the input tool, and notifying the user of the state of the input tool.

SUMMARY OF THE INVENTION

A touch input system according to an aspect of the present invention is a touch input system for input to an input screen for touch input with an input tool. The touch input system includes: a coordinate detector that detects a position coordinate of a touch with the input tool on the input screen; an input-tool identifying part that identifies an attribute regarding the input tool; a first input-tool state determiner that determines whether the input tool is in a state where the coordinate detector is able to detect the position coordinate; a second input-tool state determiner that determines whether the input tool is in a state where the input-tool identifying part is able to identify the attribute; and a notifier that notifies predetermined information based on determination results of the first input-tool state determiner and the second input-tool state determiner.

According to embodiments of the present invention, it is possible to provide a touch input system capable of determining the type of input tool, determining the state of the input tool, and notifying the user of the state of the input tool.

BRIEF DESCRIPTION OF THE DRAWINGS

FIG. 5 is an explanatory diagram that illustrates a structure of the board illustrated in FIG. 1 in cross-section in a vertical direction;

FIGS. 6A and 6B are explanatory diagrams that illustrate an example of the definition for relating a resonance frequency with an attribute of a pen according to the first embodiment;

FIG. 8 is an explanatory diagram that illustrates the external appearances of the pen and the identifier according to the first embodiment;

DESCRIPTION OF THE PREFERRED EMBODIMENTS

The present invention is described below in more detail with reference to the drawings. The following description is an example in all aspects, and it should not be understood that the present invention is limited thereto.

The touch input system according to the present invention is a system for giving input to an input screen for touch input with an input tool. Here, the input screen includes various media to which information is input with an input tool, e.g., a board such as a whiteboard or a blackboard, or a touch panel (touch panel device) with a display such as an electronic blackboard (electronic board). According to the embodiment of the present invention, a whiteboard (hereinafter, referred to as "board") is primarily used as an example of the input screen in the description. The input tool includes various writing tools capable of writing, or the like, on the input screen, e.g., a pen such as a marker pen or an electronic pen, an eraser, or a brush. According to the embodiment of the present invention, a marker pen (hereinafter, referred to as "pen") is primarily used as an example of the input tool. The touch input is an input to the input screen with the input tool and includes, for example, writing with the pen (marker pen, electronic pen) or the brush and erasing of handwriting with the eraser.

First Embodiment

Configuration of Touch Input System

Figure 1:
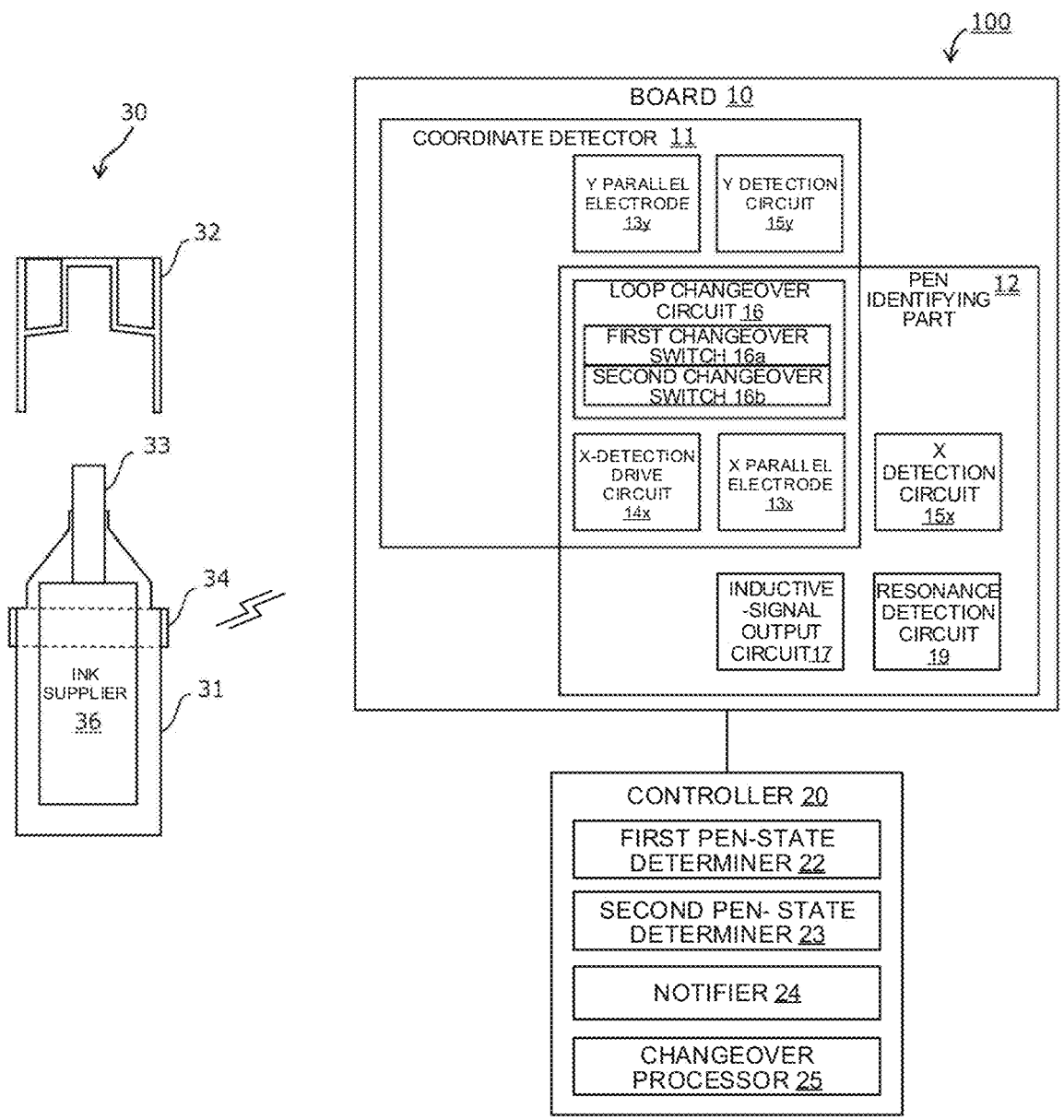
FIG. 1 is an explanatory diagram that illustrates a configuration example of a touch input system according to a first embodiment of the present invention.
Figure 2:
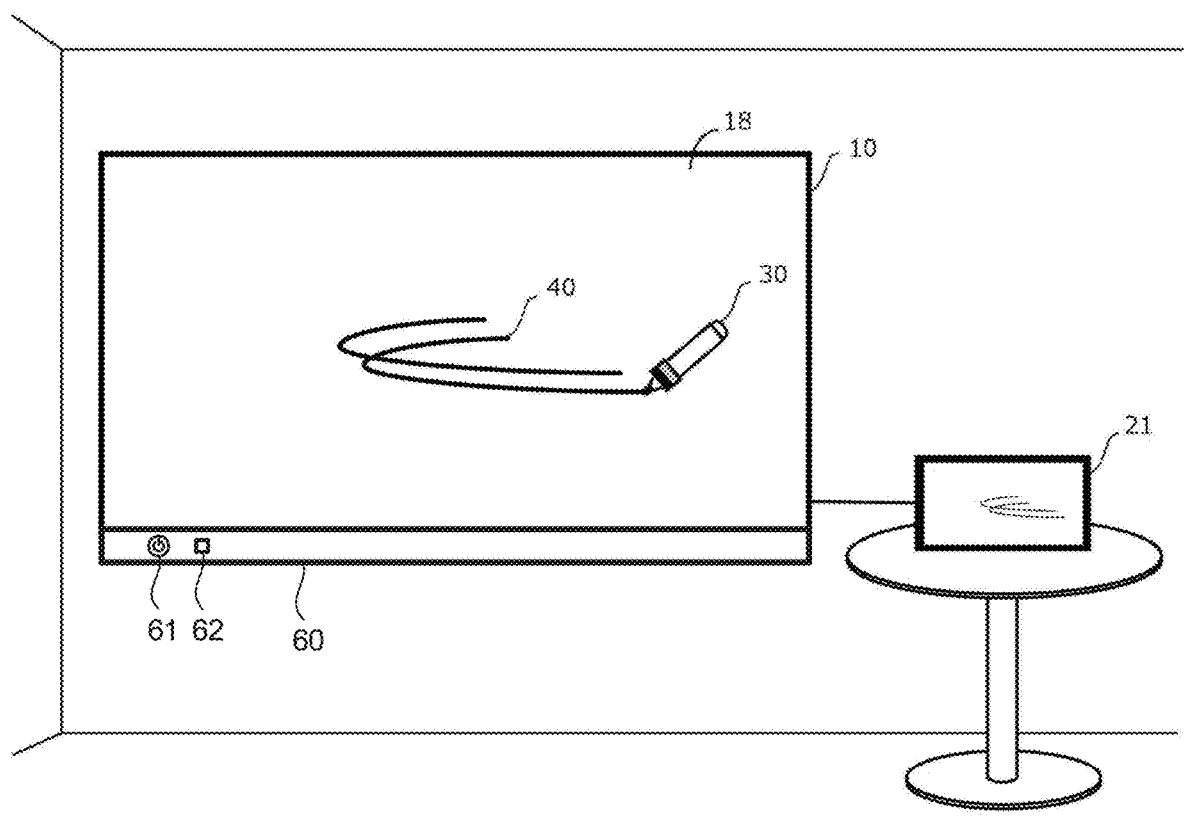
FIG. 2 is an explanatory diagram that illustrates an example of the mode in which the touch input system illustrated in FIG. 1 is used.
Figure 3:
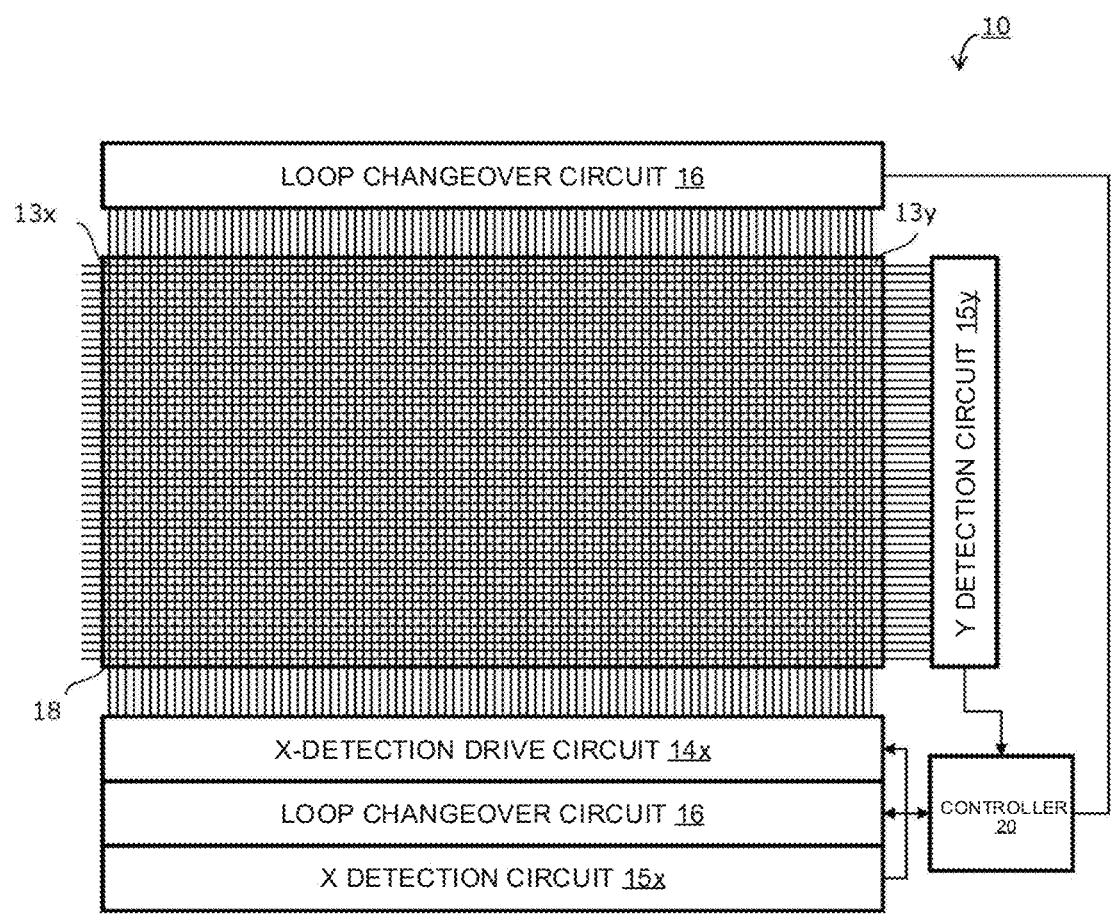
FIG. 3 is an explanatory diagram that illustrates a configuration of a board illustrated in FIG. 1, particularly the arrangement of X parallel electrodes and Y parallel electrodes.
Figure 4:
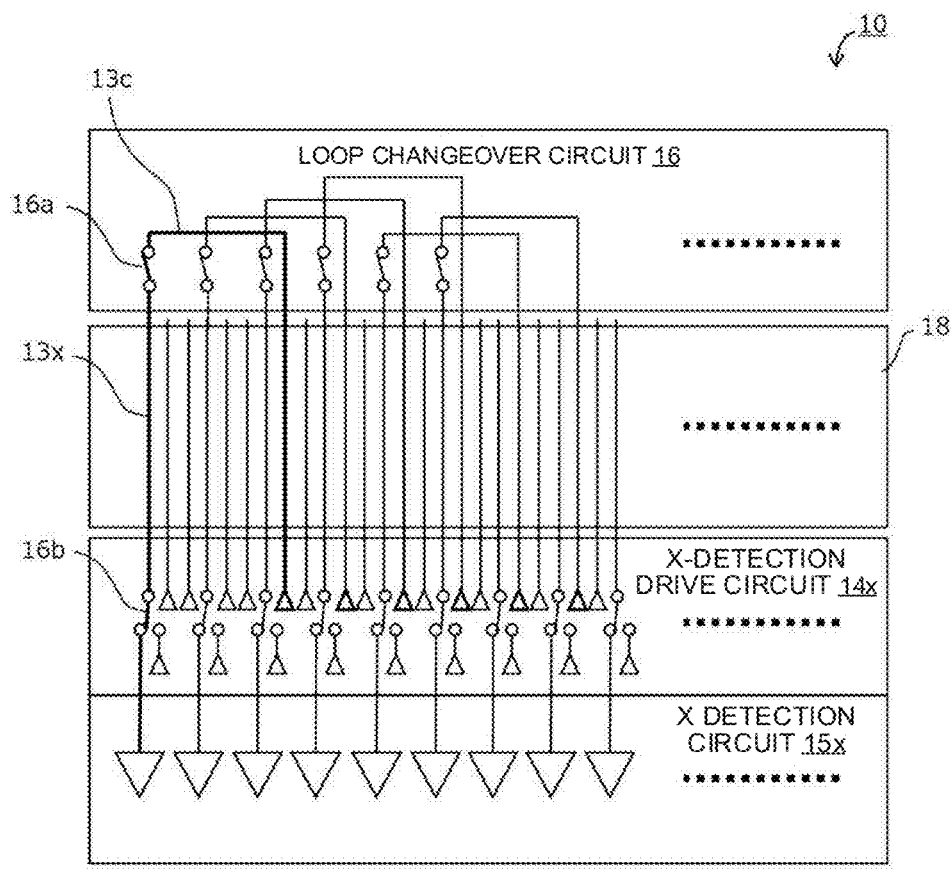
FIG. 4 is an explanatory diagram that illustrates a function of a loop changeover circuit in the board illustrated in FIG. 1.

FIG. 1 is an explanatory diagram that illustrates a configuration example of a touch input system according to the first embodiment of the present invention. FIG. 2 is an explanatory diagram that illustrates an example of the mode in which the touch input system illustrated in FIG. 1 is used. FIG. 3 is an explanatory diagram that illustrates a configuration of a board 10 illustrated in FIG. 1, particularly the arrangement of X parallel electrodes and Y parallel electrodes. FIG. 4 is an explanatory diagram that illustrates a function of a loop changeover circuit in the board 10 illustrated in FIG. 1. FIG. 5 is an explanatory diagram that illustrates a structure of the board 10 illustrated in FIG. 1 in cross-section in a vertical direction.

A touch input system 100 illustrated in FIG. 1 includes, roughly divided, a pen 30 and the board 10. The pen 30 includes a pen main body 31, a cap 32, a pen tip 33, an identifier 34, and an ink supplier 36. FIG. 1 illustrates the pen 30 in such a mode so as to understand its shape. The identifier 34 includes an identification-signal output circuit that is not illustrated in FIG. 1. The specific configuration of the identifier 34 is described later.

The cap 32 is attachable to and detachable from the pen main body 31, and it covers the pen tip 33 so as not to be exposed in a state where the cap 32 is attached to the pen main body 31.

The pen tip 33 is formed of a felt material impregnated with ink. Typically, the pen 30 has a configuration known as a marker pen for a whiteboard. When the end of the pen tip 33, which is exposed after the cap 32 is removed, touches a writing area 18 of the board 10, the ink adheres to the corresponding position so that handwriting 40 remains on the board 10 (see FIG. 2).

The other end of the pen tip 33 is in contact with the ink supplier 36 in which the ink is stored, and the ink is supplied from the ink supplier 36 to the pen tip 33 by capillary action.

The identifier 34 is attached to the outer periphery of the pen main body 31 close to the area into which the cap 32 is fitted. The identifier 34 is configured to be attachable to (detachable from) the pen 30. As described above, the identifier 34 includes the identification-signal output circuit that is not illustrated in FIG. 1. The specific configuration of the identification-signal output circuit is, for example, an LC resonance circuit formed of an inductance component L and a capacitor component C. The LC resonance circuit is an example of the identification-signal output circuit according to the present invention.

The writing area 18 (see FIG. 2) of the board 10 allows handwriting to remain after writing with the pen 30. Preferably, it allows the handwriting to be erased. The board 10 may be disposable if it is formable at low cost; however, it is preferable that handwriting is erasable and repeated writing is enabled. An operation panel 60 is provided at the lower end of the board 10. The operation panel 60 includes a power button 61 for selectively turning on/off the power of the board 10 and an indicator 62 (Light Emitting Diode (LED)) for presenting information (described later) indicating the on/off state of the power, the state (normal/faulty) of the pen 30, etc.

As illustrated in FIG. 5, the circumference of the board 10 is surrounded by an edge member 19a to ensure its strength. The front surface of the board 10 whose circumference is surrounded by the edge member 19a is the writing area 18. A pen holder 19b is provided at the lower end. In a case where the pen 30 is a marker pen, the corresponding writing area 18 has a surface like a marker board.

As illustrated in FIG. 1, the board 10 includes, roughly divided in terms of functionality, a coordinate detector 11 and a pen identifying part 12.

The coordinate detector 11 detects the coordinates of the position where the pen tip 33 of the pen 30 touches the board 10. The pen identifying part 12 detects an identification signal from the identifier 34 attached to the pen 30 and identifies the attribute (described later) regarding the pen 30.

In an example of the configuration for performing the above functions, the coordinate detector 11 according to the first embodiment operates as a capacitive touch panel. The pen identifying part 12 operates as an electromagnetic induction circuit to detect an identification signal from the identifier 34.

The coordinate detector 11 includes a Y parallel electrode 13y, a Y detection circuit 15y, an X parallel electrode 13x, an X-detection drive circuit 14x, and a loop changeover circuit 16. Among them, the X parallel electrode 13x and the X-detection drive circuit 14x are the hardware that is shared by the coordinate detector 11 and the pen identifying part 12. The loop changeover circuit 16 is a circuit for changing the shared hardware for a case where it is used in the coordinate detector 11 and for a case where it is used in the pen identifying part 12. The coordinate detector 11 is an example of a coordinate detector according to the present invention.

The pen identifying part 12 includes the X parallel electrode 13x and the X-detection drive circuit 14x, which are shared with the coordinate detector 11, the loop changeover circuit 16 for changing the hardware, and an X detection circuit 15x. The pen identifying part 12 is an example of an input-tool identifying part according to the present invention.

The X parallel electrodes 13x are electrodes embedded near the surface of the board 10 to which writing is applied with the pen 30. The X parallel electrodes 13x are arranged side by side in the X direction (horizontal direction) and extend in the Y direction (vertical direction) (see FIG. 3).

The Y parallel electrodes 13y are multiple electrodes embedded near the surface of the board 10 to which writing is applied with the pen 30. The Y parallel electrodes 13y are arranged side by side in the Y direction (vertical direction) and extend in the X direction (horizontal direction) (see FIG. 3). Each of the Y parallel electrodes 13y is embedded in a depth different from each of the X parallel electrodes 13x. Therefore, each of the Y parallel electrodes 13y intersects with each of the X parallel electrodes 13x with an insulating layer of a predetermined thickness interposed therebetween and has no contact with them (see FIG. 5).

As the material of the surface of the board 10 forming the writing area 18, an aluminum plate for electrically shielding the X parallel electrode 13x and the Y parallel electrode 13y embedded near the surface, a steel plate for magnetically shielding them, or the like, are not appropriate. For example, resin material such as epoxy resin or polycarbonate resin, coated with melamine resin on the surface is applicable.

As illustrated in FIG. 3, the X-detection drive circuit 14x is connected to one end side of the X parallel electrodes 13x to apply a predetermined voltage to each of the X parallel electrodes 13x. The applied voltage may be different in the case of the function as the coordinate detector 11 and in the case of the function as the pen identifying part 12. As the applied voltage, for example, an impulse voltage is sequentially applied from the X parallel electrode 13x on the left end to the X parallel electrode 13x on the right end.

The Y detection circuit 15y detects the magnitude of the voltage or the current induced in each of the Y parallel electrodes 13y in accordance with the driving of the X-detection drive circuit 14x. The magnitude of the voltage or the current depends on the magnitude of the coupling capacitance of each of the X parallel electrodes 13x and each of the Y parallel electrodes 13y, and the magnitude of the coupling capacitance is different depending on whether the dielectric or the metallic body is in contact with the board near the intersection of the X parallel electrode 13x and the Y parallel electrode 13y. For example, as the ink-impregnated pen tip 33 and the human finger are dielectrics, the coupling capacitance increases when they touch the board 10. The position coordinates of a touch with the pen tip 33 or the human finger on the board 10 is detectable by detecting a change in the coupling capacitance. This is known as an operation of a capacitive touch panel. In this manner, the coordinate detector 11 detects a change in the capacitance at the contact area between the board 10 and the ink-impregnated pen tip 33 of the pen 30 or at the handwriting area (the handwriting 40) caused by the application of the ink to the board 10 due to the contact between the pen tip 33 and the board 10 so as to detect the position coordinates.

Generally, the human finger and the pen tip 33 have different coupling capacitance levels; therefore, the human finger and the pen tip 33 may be discriminated based on a difference in the coupling capacitance level in addition to detecting the position coordinates of the touch.

As illustrated in FIG. 4, the loop changeover circuit 16 includes a first changeover switch 16a that makes a switchover to connect or not to connect the two X parallel electrodes 13x, which are separated from each other by a predetermined distance, among the X parallel electrodes 13x at the other end side. When the X parallel electrodes 13x in pair are coupled at the other end side by the first changeover switch 16a, a U-shaped current path is formed, which functions as an induction coil of the pen identifying part 12. A second changeover switch 16b is provided on one end side of the U-shaped current path.

The second changeover switch 16b operates in synchronization with the first changeover switch 16a. While the first changeover switch 16a disconnects the X parallel electrodes 13x in pair, the second changeover switch 16b connects the X parallel electrodes 13x to the X-detection drive circuit 14x. While the first changeover switch 16a connects the X parallel electrodes 13x in pair, the second changeover switch 16b connects the X parallel electrodes 13x to the X detection circuit 15x. Thus, in a state where the X parallel electrodes 13x in pair are separated, each of the X parallel electrodes 13x is driven by the corresponding X-detection drive circuit 14x.

In a state where the X parallel electrodes 13x in pair are connected to form the U-shaped current path as an induction coil, the second changeover switch 16b connects the X parallel electrode 13x on one end side of the U-shaped current path to the X detection circuit 15x. There is no changeover switch on the other end side of the U-shaped current path, and the other end side is driven by the X-detection drive circuit 14x.

According to the first embodiment, there are multiple groups of U-shaped current paths (loop circuits) forming an induction coil, and the groups are arranged in the X direction (horizontal direction).

When the loop changeover circuit 16 uses the X parallel electrode 13x as the pen identifying part 12, for example, the induction coils are sequentially driven one by one from the induction coil at the left end to the induction coil at the right end. In FIG. 4, in order to indicate that the induction coil at the left end is driven, an induction coil 13c at the left end is illustrated by a thick line as compared with the other induction coils. The other end of the induction coil 13c, which is a U-shaped current path, is driven by the X-detection drive circuit 14x while the drive frequency is changed. The X detection circuit 15x at one end side of the induction coil 13c detects the magnitude of the current flowing through the induction coil corresponding to the frequency. Then, the detection is conducted in the same manner for the adjacent induction coil on the right, and the detection is conducted by sequentially making the shift to the adjacent induction coil on the right.

The loop changeover circuit 16 is a component needed for the coordinate detector 11 and the pen identifying part 12 to share the X parallel electrode 13x.

When the identifier 34 is present near the driven induction coil and the induction coil is driven at the drive frequency corresponding to the resonance frequency of the identifier 34, the large resonance current flows in a resonance circuit 35 due to the electromagnetic coupling with the induction coil. Accordingly, a large current flows on the side of the induction coil. The X detection circuit 15x detects the magnitude of the current so as to detect which area in the X direction the identifier 34 is present and which resonance frequency the identifier 34 has.

The resonance frequency of the identifier 34 is previously defined corresponding to the attribute of the pen 30.

FIGS. 6A and 6B are explanatory diagrams that illustrate an example of the definition for relating a resonance frequency f0 with an attribute of the pen 30. The list illustrated in FIG. 6A represents an example in which the resonance frequency f0 of the identifier 34 is related to the ink color (writing color) of the pen 30. The different resonance frequencies f0 are defined corresponding to different colors of the pen 30, e.g., black, blue, green, yellow, orange, and red. Based on the writing color of the pen 30, the user attaches the identifier 34 with the corresponding resonance frequency f0 to the pen 30.

The list illustrated in FIG. 6B represents an example of the definition for relating the resonance frequency f0 to the combination of attributes such as the thickness of a nib and the shape of the nib as well as the writing color of the pen 30. As in the list of FIG. 6B, as the resonance frequency f0 is assigned uniquely corresponding to the combination of attributes in multiple items, the attributes in the items corresponding to the detected resonance frequency f0 may be obtained. The value of the resonance frequency f0 is not limited to the values illustrated in FIGS. 6A and 6B, and it is selected based on the balance of the size of a resonance coil 341 (described later) of the identifier 34 and the oscillation energy (intensity). For example, the resonance frequency f0 may be defined in the range of from 400 kHz to 700 kHz.

After the coordinate detector 11 detects the position coordinates of the pen tip 33 in the area where the pen identifying part 12 detects the presence of the identifier 34, handwriting data corresponding to the position coordinates and the attribute of the pen corresponding to the identification information is generated.

The handwriting data may be generated based on the detection details of the coordinate detector 11 and the pen identifying part 12 by, for example, causing a personal computer to execute a dedicated processing program. Alternatively, a microcomputer may be incorporated in the board 10 so that the microcomputer performs a process to generate handwriting data as well as the process of the coordinate detector 11 or the pen identifying part 12.

FIG. 1 illustrates a controller 20 as the subject that performs a process to generate handwriting data. The controller 20 includes, primarily, a CPU or a microcomputer as well as a peripheral circuit, such as a timer or an input/output circuit, a memory, and the like.

The controller 20 may be separate from the board 10 or may be integrated with the board 10, that is, incorporated in the board 10.

In other words, processing may be performed outside the touch input system 100 according to the first embodiment or may be included in the touch input system 100.

In the former case, the touch input system 100 detects and provides the basic information for generating handwriting data. In the latter case, the generation of handwriting data is additionally included.

In a case where the touch input system 100 generates handwriting data, a display device 21 may be coupled to the controller 20 so that the generated handwriting data is displayed in real-time, as illustrated in, for example, FIG. 2.

Obviously, without the display on the display device 21, the handwriting 40 written with the pen 30 remains on the writing area 18 of the board 10.

The display device 21 is effective to confirm that the handwriting data generated by the controller 20 matches the handwriting 40 on the writing area 18.

The handwriting data reflects the attribute of the pen 30. For example, according to the definition in of FIG. 6A, the writing color of the handwriting data displayed on the display device 21 matches the writing color of the handwriting 40. Furthermore, according to the definition in FIG. 6B, in the displayed handwriting data, the thickness and the shape of the handwriting further reflects the thickness and the shape of the pen tip 33. When a hard copy of the handwriting data is printed out by using a color printer (not illustrated), the obtained hard copy reflects the writing color and, further, the thickness and the shape of the nib.

Configuration Example of Pen and Identification Circuit

Next, the configurations of the pen 30 and the identification circuit according to the first embodiment are described in more detail.

Figure 7A:
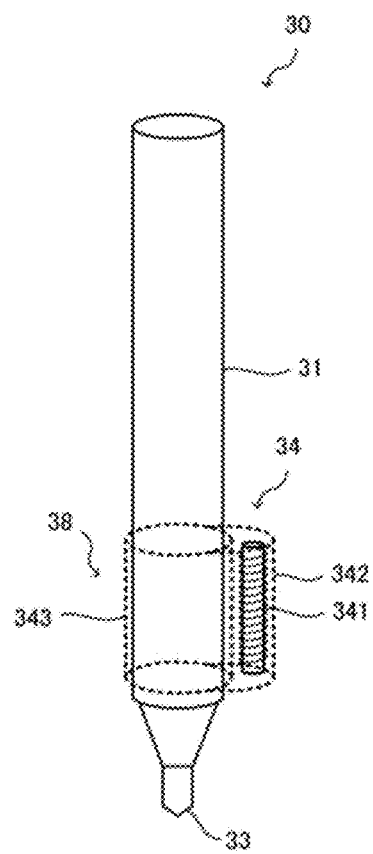
FIGS. 7A to 7D are explanatory diagrams that illustrate the external appearances of the pen and an identifier and a resonance circuit that is an identification circuit according to the first embodiment.
Figure 7B:
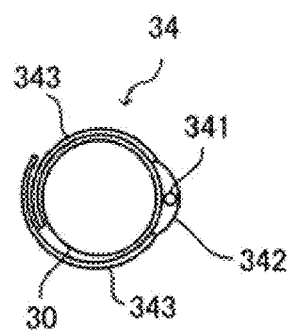
Figure 7C:
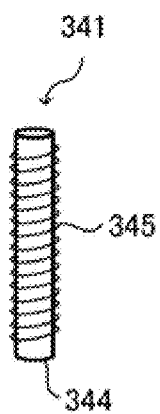
Figure 7D:
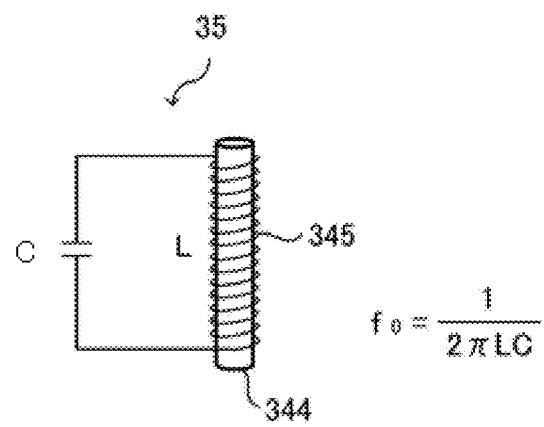

FIGS. 7A to 7D are explanatory diagrams that illustrate the external appearance of the pen 30, the external appearance of the identifier 34 including the identification circuit, and the resonance circuit 35 that is an identification circuit according to the first embodiment. FIG. 7A illustrates the external appearance (side view) of the pen 30, FIG. 7B illustrates the external appearance (top view) of the identifier 34, FIG. 7C illustrates the external appearance (side view) of the resonance coil 341 (resonance part), and FIG. 7D illustrates the resonance circuit 35. FIG. 7A illustrates a state where the identifier 34 is attached to the pen main body 31 of the pen 30.

As illustrated in FIG. 7A, the identifier 34 is mounted near the pen tip 33 of the pen main body 31. The identifier 34 includes the resonance circuit 35 (identification-signal output circuit) (not illustrated in FIG. 7A) including the resonance coil 341 (resonance part), a housing part 342 for housing the resonance coil 341, and a securing member 343 for securing the identifier 34 to the pen main body 31.

The resonance coil 341 is formed of a shaft core 344 and a conducting wire 345 (e.g., a litz wire) wound around the shaft core 344 in a coil shape, as illustrated in FIG. 7C. The shaft core 344 is an iron core, such as a ferrite bar, having a diameter of 3 mm. The resonance coil 341 is formed to have an elongated cylindrical shape that extends toward the tip of the pen 30 when the identifier 34 is attached to the pen 30. The resonance coil 341 is configured to have an outer shape thinner than that of the pen 30.

The resonance circuit 35 is housed in the housing part 342 and fixed in the housing part 342. The housing part 342 houses the resonance coil 341 such that the axial direction thereof (the longitudinal direction: the direction perpendicular to the winding direction of the conducting wire 345) is in the axial direction (the longitudinal direction) of the pen 30 (for example, both the longitudinal directions coincide with each other).

FIG. 7D illustrates a configuration of the resonance circuit 35. As illustrated in the figure, the resonance circuit 35 is formed of the inductance L and the capacitor C. The LC resonance circuit illustrated in FIG. 7D is formed by, for example, molding the resonance coil 341 (the shaft core 344 and the conducting wire 345) with resin and connecting the capacitors to both ends of the conducting wire 345. The LC resonance circuit may be formed by forming a conductive circuit pattern on a film insulator, such as a flexible substrate, and joining both ends of the insulator to form a loop.

The resonance circuit 35 having the different resonance frequency f0 may be obtained by changing the magnitude of at least any one of the inductance L and the capacitor C. That is, the resonance circuit 35 has the unique resonance frequency f0 and outputs an identification signal for identifying the attribute regarding the pen 30.

The pen identifying part 12 identifies the attribute of the pen 30 based on the identification signal output from the resonance circuit 35. For example, the pen identifying part 12 includes: an inductive-signal output circuit 17 (see FIG. 1) that outputs an inductive signal to the resonance circuit 35; and a resonance detection circuit 19 (see FIG. 1) that detects the resonance induced in the resonance circuit 35 due to the inductive signal. The pen identifying part 12 uses the inductive-signal output circuit 17 to output inductive signals at multiple frequencies and determines the presence or absence of resonance with regard to the inductive signal at each frequency. The pen identifying part 12 detects the resonance frequency of the resonance circuit 35 at which the resonance is detected and identifies the attribute that is previously defined corresponding to the detected resonance frequency.

The identification signal corresponding to the attribute is identification information for identifying at least any one of the writing color, the thickness of the pen tip 33 of the pen 30, and the shape of the pen tip 33. Thus, as illustrated in FIGS. 6A and 6B, it is possible to obtain the identifier 34 corresponding to the multiple resonance frequencies f0.

The securing member 343 secures (fixes) the housing part 342 housing the resonance circuit 35 to the pen main body 31. The securing member 343 is, for example, a hook and loop fastener (see FIG. 7B) such as Velcro (registered trademark), a double-sided tape, a fixing belt (fixing band), or an adhesive. The securing member 343 may be configured as a holder (clip) made of polycarbonate or reinforced plastic as illustrated in FIG. 8. In a case where the securing member 343 is shaped like a holder, the securing member 343 has such a size that the inner diameter thereof is tightly engaged with the outer diameter of the pen main body 31. Preferably, the inner peripheral surface is provided with an elastic material such as rubber or polyurethane resin so that, even if the outer diameter of the pen main body 31 is slightly different, the identifier 34 may be attached and secured to the pen main body 31.

Preferably, the securing member 343 detachably secures the identifier 34 to the pen 30 near the tip of the pen 30. The securing member 343 secures the identifier 34 to the area between the central portion of the pen main body 31 and the pen tip 33.

The pen main body 31 and the cap 32 may be of a commercially available marker pen.

As illustrated in FIG. 7B, the identifier 34 may be secured by winding the securing member 343 (e.g., a hook and loop fastener) around the pen main body 31. The user uses the pen 30 in the state illustrated in FIG. 7B. That is, even when a commercially available marker pen is used, the pen 30 according to the first embodiment may be implemented by attaching the identifier 34 to the marker pen.

As illustrated in FIG. 7A, it is preferable that the identifier 34 is attached to the pen main body 31 near the pen tip 33, and it is preferable that the identifier 34 is attached to such a position that the cap 32 (see FIG. 1) is properly fitted while the identifier 34 is secured to the pen main body 31. Preferably, the identifier 34 is attached to (located at) a grip part 38 (a part gripped with the hand) that is gripped by the user to write with the pen 30.

With the above configuration, the resonance coil 341 of the identifier 34 is mounted along the outer peripheral surface (side surface) of the pen 30 in the axial direction (longitudinal direction) near the pen tip 33 of the pen main body 31.

With the above configuration, the identifier 34 may be easily attached to and detached from the pen 30. For example, the identifier 34 may be easily attached to a general-purpose pen, manufactured by an office supplies manufacturer, which is regularly purchased and used by the user. When the ink of the general-purpose pen runs out, the identifier 34 may be easily removed and attached to a new general-purpose pen. In this manner, for example, the identifier 34 may be attached to a commercially available marker pen while in use and, after the marker pen has been consumed, the identifier 34 may be removed and the removed identifier 34 may be attached to a new marker pen. That is, the identifier 34 is reusable. The ferrite bar forming the shaft core 344 of the resonance coil 341 may be formed in a plate shape having a thickness of, for example, 1 mm to 1.5 mm. This allows a reduction in the size and the thickness of the identifier 34 while the sensitivity of the resonance coil 341 is maintained.

The identifier 34 (the resonance coil 341 and the resonance circuit 35) may be provided inside the pen 30. For example, the resonance coil 341 may be disposed on the extension of the pen tip 33 inside the pen 30 or may be disposed in a housing space that is a cutout formed on the side surface of the pen main body 31.

In the touch input system 100, the pen 30 sometimes enters a state in which the coordinate detector 11 is not able to detect the position coordinates of the pen 30. For example, when the remaining amount of ink in the ink supplier 36 is insufficient and the amount of ink impregnated in the pen tip 33 falls below the minimum amount with which a change in the coupling capacitance is detectable, the coordinate detector 11 is not able to detect the position coordinates of the pen 30. In this case, although the handwriting 40 may remain on the board 10 in a faded state (weakly), it is difficult for the controller 20 to generate the handwriting data. Thus, a problem arises, such as a difficulty in generating handwriting data.

Furthermore, in the touch input system 100, the pen 30 sometimes enters a state in which the pen identifying part 12 is not able to identify the attribute of the pen 30. For example, when the user uses the pen 30 having the identifier 34 not attached thereto to write on the board 10, the pen identifying part 12 is not able to identify the attribute of the pen 30. For example, the pen identifying part 12 is not able to identify the color of the pen 30 used by the user. In this case, it is difficult for the controller 20 to generate appropriate handwriting data. For this reason, a problem occurs, for example, handwriting data on the content all in the same color is generated for the content written in different colors, or no handwriting data is generated.

However, it is difficult for the user writing on the board 10 with the pen 30 to recognize that the above problems have occurred. Therefore, in addition to the above-described configuration, the touch input system 100 has a configuration to determine the state of the pen 30 and notify the user of the information corresponding to a determination result.

Specifically, as illustrated in FIG. 1, the controller 20 includes a first pen-state determiner 22, a second pen-state determiner 23, and a notifier 24.

The first pen-state determiner 22 determines whether the pen 30 is in a state where the coordinate detector 11 is able to detect the position coordinates. Specifically, the first pen-state determiner 22 determines whether the coordinate detector 11 has detected the position coordinates. In a case where the coordinate detector 11 has detected the position coordinates, the first pen-state determiner 22 determines that the pen 30 is in a state where the coordinate detector 11 is able to detect the position coordinates and, in a case where the coordinate detector 11 has not detected the position coordinates, the first pen-state determiner 22 determines that the pen 30 is in a state where the coordinate detector 11 is not able to detect the position coordinates.

The second pen-state determiner 23 determines whether the pen 30 is in a state where the pen identifying part 12 is able to identify the attribute. Specifically, the second pen-state determiner 23 determines whether the pen identifying part 12 has detected the identification signal. In a case where the pen identifying part 12 has detected the identification signal, the second pen-state determiner 23 determines that the pen 30 is in a state where the pen identifying part 12 is able to identify the attribute and, in a case where the pen identifying part 12 has not detected the identification signal, the second pen-state determiner 23 determines that the pen 30 is in a state where the pen identifying part 12 is not able to identify the attribute.

The notifier 24 performs a notification process to notify predetermined information based on the determination results of the first pen-state determiner 22 and the second pen-state determiner 23.

For example, in a case where the second pen-state determiner 23 determines that the pen 30 is in a state where the pen identifying part 12 is not able to identify the attribute, the notifier 24 notifies information (first information) indicating that the identifier 34 is not attached to the pen 30. Specifically, in a case where the first pen-state determiner 22 determines that the pen 30 is in a state where the coordinate detector 11 is able to detect the position coordinates and the second pen-state determiner 23 determines that the pen 30 is in a state where the pen identifying part 12 is not able to identify the attribute, the notifier 24 notifies the information indicating that the identifier 34 is not attached to the pen 30 as the information (the first information) indicating that the pen 30 is faulty. For example, the notifier 24 flashes the indicator 62 on the operation panel 60 illustrated in FIG. 1 in a predetermined color (e.g., yellow).

For example, in a case where the first pen-state determiner 22 determines that the pen 30 is in a state where the coordinate detector 11 is not able to detect the position coordinates, the notifier 24 notifies information (second information) indicating that the amount of ink is insufficient. Specifically, in a case where the first pen-state determiner 22 determines that the pen 30 is in a state where the coordinate detector 11 is not able to detect the position coordinates and the second pen-state determiner 23 determines that the pen 30 is in a state where the pen identifying part 12 is able to identify the attribute, the notifier 24 notifies the information indicating that the amount of ink is insufficient as the information (the second information) indicating that the pen 30 is faulty. For example, the notifier 24 flashes the indicator 62 on the operation panel 60 illustrated in FIG. 1 in a predetermined color (e.g., blue).

In a case where the first pen-state determiner 22 determines that the pen 30 is in a state where the coordinate detector 11 is not able to detect the position coordinates and the second pen-state determiner 23 determines that the pen 30 is in a state where the pen identifying part 12 is not able to identify the attribute, the notifier 24 notifies the information indicating that the amount of ink is insufficient and the identifier 34 is not attached to the pen 30 as information (third information) indicating that the pen 30 is faulty. For example, the notifier 24 flashes the indicator 62 on the operation panel 60 illustrated in FIG. 1 in a predetermined color (e.g., red).

In a case where the pen 30 is in the normal state, that is, the first pen-state determiner 22 determines that the pen 30 is in a state where the coordinate detector 11 is able to detect the position coordinates and the second pen-state determiner 23 determines that the pen 30 is in a state where the pen identifying part 12 is able to identify the attribute, the notifier 24 notifies information (fourth information) indicating that the pen 30 is normal. For example, the notifier 24 lights up the indicator 62 in the normal color (e.g., white).

Thus, the notifier 24 notifies predetermined information to the outside when a failure occurs in the pen 30. The notifier 24 notifies information corresponding to the state of the pen 30. That is, different information is notified corresponding to each state, i.e., the state where the pen 30 is normal, the state where the amount of ink is insufficient, and the state where the identifier 34 is not attached. This allows the user to know that a failure has occurred in the pen 30 and, furthermore, determine the cause of the failure of the pen 30.

The notifier 24 may output a sound (warning sound, voice, buzzer, etc.) corresponding to the first information to the fourth information. The notifier 24 may output a warning sound (the first information to the third information) when a failure of the pen 30 is detected. In this case, the notifier 24 may output the same warning sound or may output a different warning sound corresponding to the first information to the third information.

Here, in the touch input system 100, a coordinate detection process for detecting the position coordinates by the coordinate detector 11 and an attribute identification process for identifying the attribute by the pen identifying part 12 are alternately executed. To implement this configuration, the controller 20 further includes a changeover processor 25 (see FIG. 1) that makes a changeover between the coordinate detection process and the attribute identification process.

Figure 9:
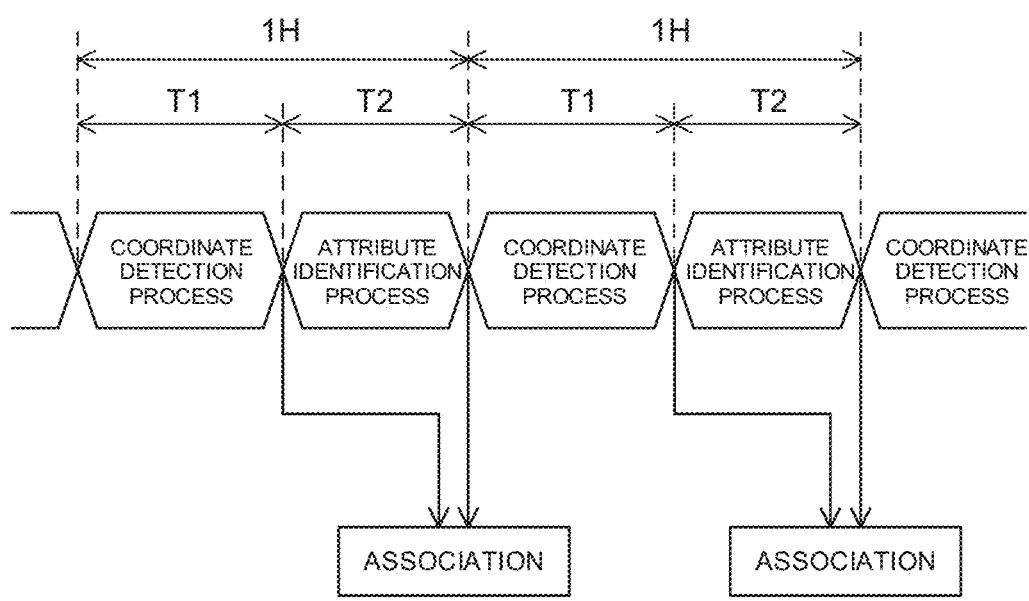
FIG. 9 is a schematic diagram that illustrates how a coordinate detection process and an attribute identification process are changed in the touch input system according to the first embodiment.

FIG. 9 is a schematic diagram that illustrates how the coordinate detection process and the attribute identification process are changed. For example, the changeover processor 25 transmits a first changeover signal to the loop changeover circuit 16. After receiving the first changeover signal, the loop changeover circuit 16 disconnects the U-shaped current path (loop circuit) formed by the X parallel electrodes 13x in pair and separates the X parallel electrodes 13x from the X detection circuit 15x, as described above. Thus, the coordinate detection process is performed to detect the position coordinates corresponding to the X parallel electrodes 13x for one line during a first period T1 (e.g., 5 ms) in one horizontal scanning period (1H: e.g., 9 ms).

After the coordinate detection process is finished, the changeover processor 25 transmits a second changeover signal to the loop changeover circuit 16. After receiving the second changeover signal, the loop changeover circuit 16 connects the X parallel electrodes 13x in pair to form the U-shaped current path (loop circuit) and also connects the X parallel electrodes 13x in pair to the X detection circuit 15x, as described above. Thus, the attribute identification process is performed during a second period T2 (e.g., 4 ms) in one horizontal scanning period. In this manner, the changeover processor 25 alternately outputs the first changeover signal and the second changeover signal at predetermined timing to make a changeover between the coordinate detection process and the attribute identification process.

The controller 20 acquires the processing result of the coordinate detection process and the processing result of the attribute identification process, associates the information on the position coordinates of the pen 30 with the information on the attribute (e.g., writing color) of the pen 30, and stores them. Then, the controller 20 generates the handwriting data based on the associated information.

The first pen-state determiner 22 performs the determination process each time the coordinate detection process is performed, and the second pen-state determiner 23 performs the determination process each time the attribute identification process is performed. When the pen 30 is in the normal state, the controller 20 generates the handwriting data based on the information on the position coordinates of the pen 30 and the information on the attribute of the pen 30, as described above.

Figure 10:
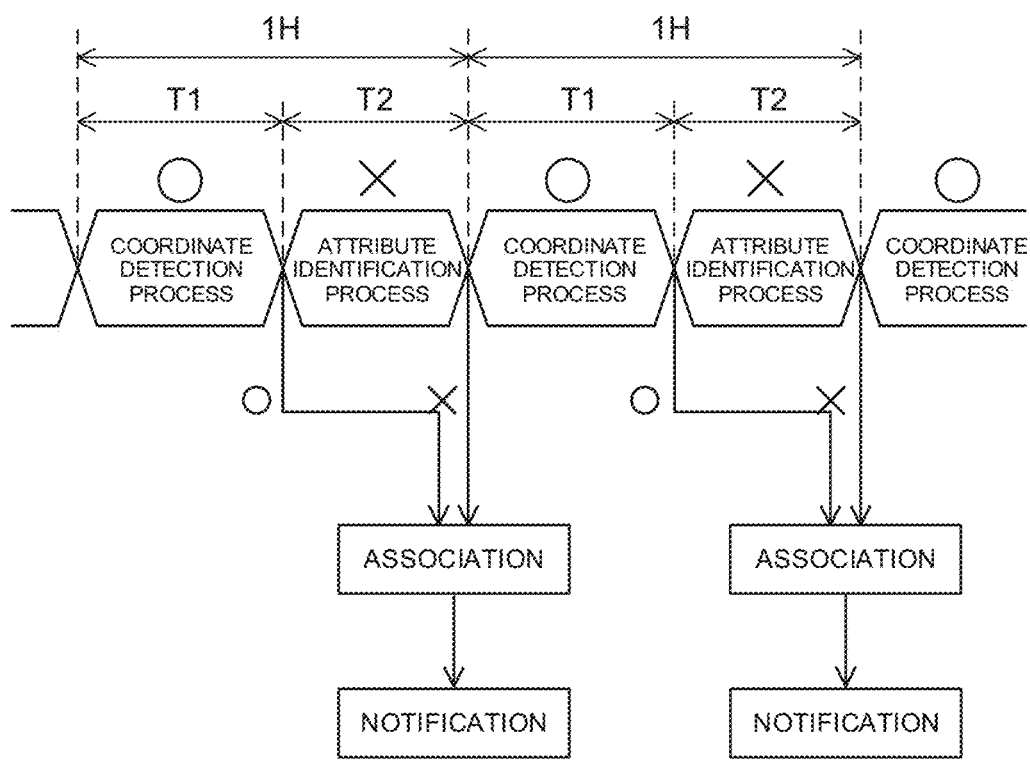
FIG. 10 is a schematic diagram that illustrates a situation where no identification signal is detected in the touch input system according to the first embodiment.

On the other hand, for example, as illustrated in FIG. 10, in a case where the first pen-state determiner 22 determines that the pen 30 is in a state where the coordinate detector 11 is able to detect the position coordinates (O) and the second pen-state determiner 23 determines that the pen 30 is in a state where the pen identifying part 12 is not able to identify the attribute (X), the controller 20 associates the information on the determination results. Then, for example, the notifier 24 causes the indicator 62 to flash in yellow based on the associated information.

Figure 11:
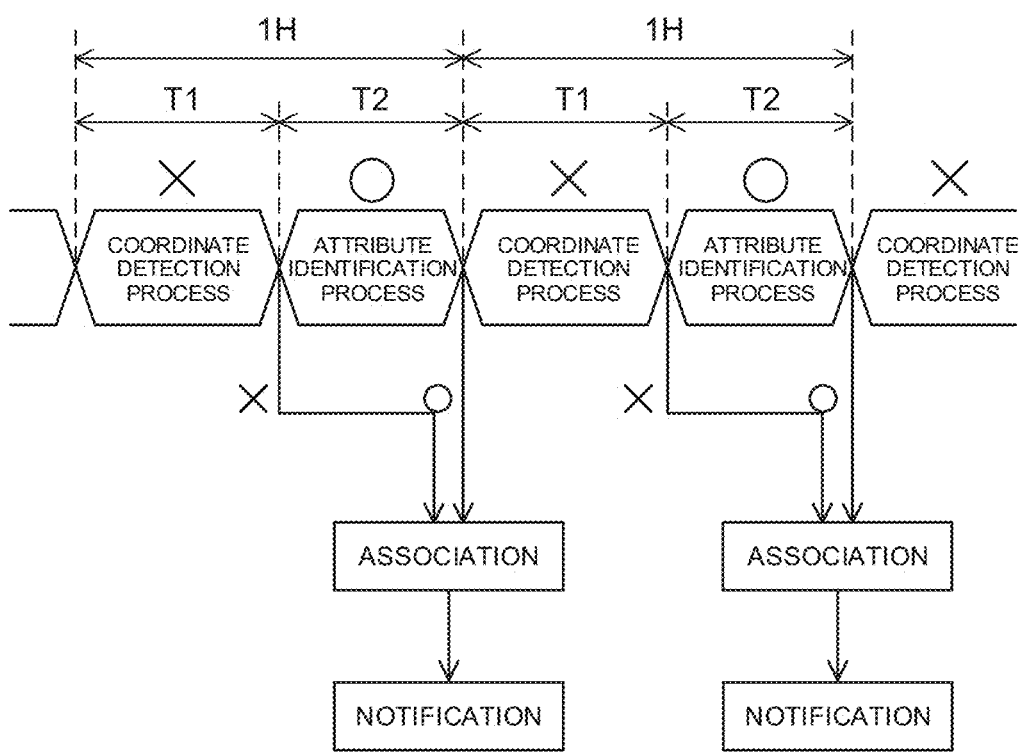
FIG. 11 is a schematic diagram that illustrates a situation where no position coordinates are detected in the touch input system according to the first embodiment.

For example, as illustrated in FIG. 11, in a case where the first pen-state determiner 22 determines that the pen 30 is in a state where the coordinate detector 11 is not able to detect the position coordinates (X) and the second pen-state determiner 23 determines that the pen 30 is in a state where the pen identifying part 12 is able to identify the attribute (O), the controller 20 associates the information on the determination results. Then, for example, the notifier 24 causes the indicator 62 to flash in blue based on the associated information.

Figure 12:
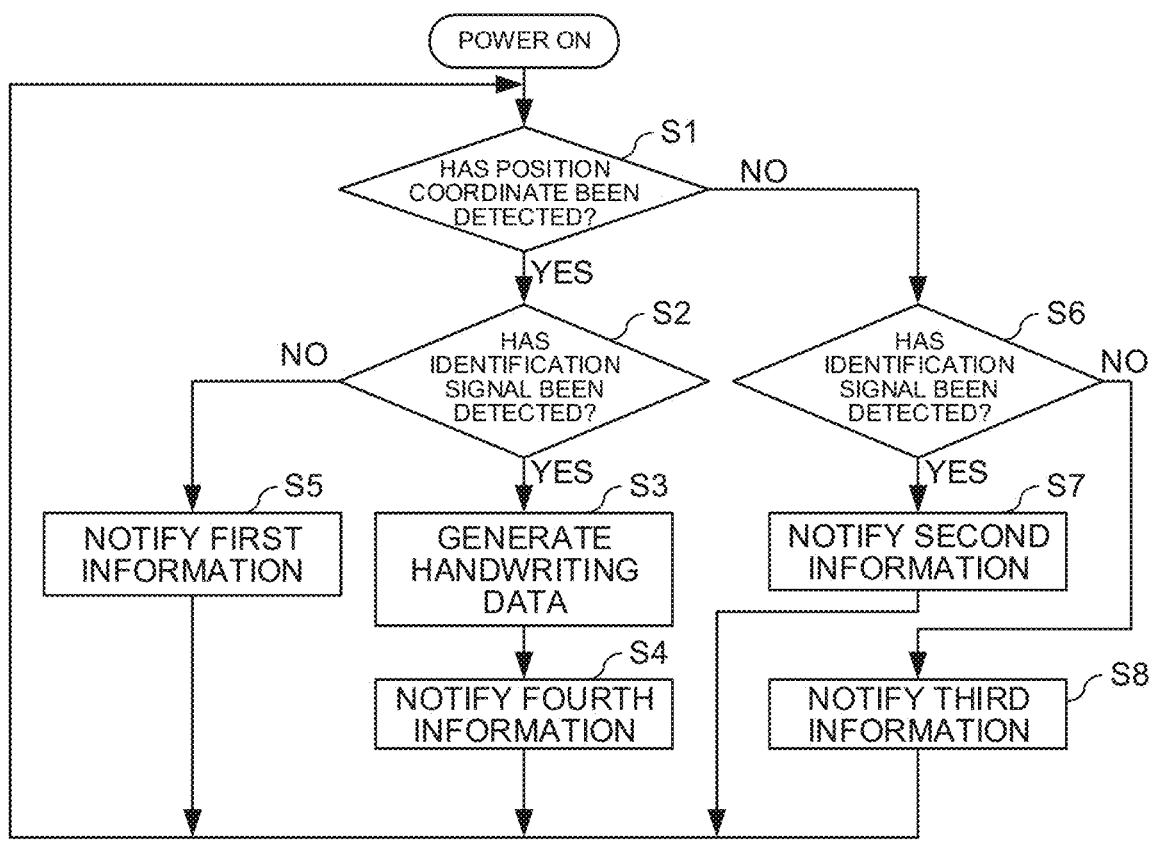
FIG. 12 is a flowchart that illustrates an example of steps of a notification process performed by the touch input system according to the first embodiment.

FIG. 12 is a flowchart that illustrates an example of steps of a notification process by the notifier 24. The notification process is executed by the controller 20. One or more steps included in the notification process described here may be omitted as needed. The execution order of the steps in the notification process may be different as long as they produce the same effect.

At Step S1, the controller 20 (the first pen-state determiner 22) determines whether the coordinate detector 11 has detected the position coordinates of the pen 30. In a case where the position coordinates have been detected (S1: YES), the process proceeds to Step S2, and in a case where the position coordinates have not been detected (S1: NO), the process proceeds to Step S5.

At Step S2, the controller 20 (the second pen-state determiner 23) determines whether the pen identifying part 12 has detected the identification signal. In a case where the identification signal has been detected (S2: YES), the process proceeds to Step S3, and in a case where the identification signal has not been detected (S2: NO), the process proceeds to Step S5. After detecting the identification signal, the pen identifying part 12 identifies (determines) the attribute based on the identification signal.

At Step S3, the controller 20 associates the information on the position coordinates of the pen 30 with the information on the attribute (e.g., writing color) of the pen 30, stores them, and generates the handwriting data based on the associated information.

Next, at Step S4, the controller 20 (the notifier 24) notifies the information (the fourth information) indicating that the pen 30 is normal. For example, the notifier 24 causes the indicator 62 (see FIG. 2) to light up in the normal color (e.g., white). Then, the process returns to Step S1.

At Step S5, the controller 20 (the notifier 24) notifies the information indicating that the identifier 34 is not attached to the pen 30 as the information (the first information) indicating that the pen 30 is faulty. For example, the notifier 24 causes the indicator 62 to flash in yellow. Then, the process returns to Step S1. At Step S5, the controller 20 may associate the information on the position coordinates of the pen 30 with the information on the temporary color (e.g., black), store them, and generate the handwriting data based on the associated information. This makes it possible to prevent a situation where no handwriting data is stored for the content written by the user.

At Step S6, the controller 20 (the second pen-state determiner 23) determines whether the pen identifying part 12 has detected the identification signal. In a case where the identification signal has been detected (S6: YES), the process proceeds to Step S7, and in a case where the identification signal has not been detected (S6: NO), the process proceeds to Step S8. After detecting the identification signal, the pen identifying part 12 identifies (determines) the attribute based on the identification signal.

At Step S7, the controller 20 (the notifier 24) notifies the information indicating that the amount of ink is insufficient as the information (the second information) indicating that the pen 30 is faulty. For example, the notifier 24 causes the indicator 62 to flash in blue. Then, the process returns to Step S1.

At Step S8, the controller 20 (the notifier 24) notifies the information indicating that the amount of ink is insufficient and the identifier 34 is not attached to the pen 30 as the information (the third information) indicating that the pen 30 is faulty. For example, the notifier 24 causes the indicator 62 to flash in red. Then, the process returns to Step S1.

In the manner described above, the notification process is repeatedly performed.

Sometimes, the user may attach, to the pen 30, the identifier 34 corresponding to a color different from the ink color (writing color) of the pen 30. For example, in some cases, although the pen 30 used by the user is in red, the identifier 34 with the resonance frequency f0 associated with blue is attached to the pen 30. In this case, although the handwriting 40 remaining on the board 10 is in red, the handwriting data is in blue. When the user has an intention to write with the pen 30 in red, it is difficult for the user to notice that the wrong identifier 34 is attached as described above, as the handwriting 40 is in red.

Therefore, it is preferable that the touch input system 100 further includes a configuration for notifying the information indicating what color the color associated with the identifier 34 attached to the pen 30 used by the user is. Specifically, in a case where the pen identifying part 12 identifies the attribute (blue in the above example) corresponding to the identification signal, the controller 20 (the notifier 24) causes the indicator 62 to light up in the corresponding color (blue). This allows the user to recognize that the color (red) of the handwriting 40 on the board 10 is different from the color (blue) of the indicator 62, whereby it is possible to know that the wrong identifier 34 is attached.

In some cases, the user uses the multiple pens 30 of different colors. In such a case, the notifier 24 may cause the single indicator 62 to sequentially light up in the colors corresponding to the identifiers 34 attached to the respective pens 30 used by the user or may cause the multiple indicators 62 to light up.

The present invention is not limited to the above-described first embodiment and may be implemented in the following embodiments. In the description of each of the following embodiments, the description is omitted for the same configuration as that in the first embodiment, and the duplicated description is omitted for functions and effects.

Second Embodiment

For example, the identifier 34 may be configured to have a battery, or the like, and output the identification signal using the power of the battery. In this case, the controller 20 may acquire the information on the remaining amount of battery power as the attribute regarding the pen 30. The controller 20 notifies the information on the remaining amount of the battery power so that the user is able to know the remaining amount of battery power of the identifier 34 attached to the pen 30.

Third Embodiment

According to the mode illustrated in FIGS. 7A to 7D, it is assumed that the pen main body 31 includes the identification circuit corresponding to the attribute of the pen 30.

Although the pen 30 is a marker pen in the description, it is not an essential condition. Preferably, the pen 30 leaves erasable handwriting on the board 10; however, it may be a writing tool such as an erasable ink ballpoint pen. At least one part of the nib of the ballpoint pen is formed of a metallic body. A capacitive touch panel is designed to conform to the characteristics of the nib so that the coordinate detector 11 is able to detect the position coordinates of the pen tip.

With regard to the writing area 18 of the board 10 written with the pen 30 that is a writing tool, a marker board is not an essential condition. For example, when the pen 30 is a ballpoint pen, the writing area 18 may have material suitable for writing with the ballpoint pen.

Furthermore, the board 10 does not need to have a plate-like structure having high rigidity and may be, for example, a sheet-like structure.

Fourth Embodiment

The identification circuit is an LC resonance circuit in the description according to the first embodiment. However, the identification circuit does not need to be an LC resonance circuit and may have a different form.

For example, instead of the resonance circuit 35, a system using a Radio Frequency Identifier (RFID) technology may be applied to the identification circuit. The RFID is the technology for reading data stored in an Integrated Circuit (IC) chip called a Radio Frequency (RF) tag by using radio waves in a non-contact manner. Instead of the resonance circuit 35 illustrated in FIGS. 7A to 7D, the identifier 34 or the pen main body 31 may have an RF tag, and the pen identifying part 12 on the board 10 side may be a circuit that reads the RF tag.

In this case, instead of the resonance frequency f0 of the resonance circuit 35, the RF tag stores data on a predefined value corresponding to the attribute of the pen.

Fifth Embodiment

In the first embodiment, it is described that preferably the handwriting is erasable. In a fifth embodiment, the synchronization between the operation to erase the handwriting and the handwriting data is described.

For example, the pen 30 is a writing tool that is similar to a marker pen and, accordingly, the writing area 18 has a surface similar to that of a marker board.

As the conventional whiteboard eraser, the eraser with the surface of an elastic member covered with raised fibers, such as urethane, is used. Handwriting on the writing area 18 may be removed by using an eraser made of the same material as that of the marker pen to erase the handwriting on the writing area 18.

Although the handwriting on the writing area 18 may be erased by using the above conventional eraser, it is difficult to synchronize and update the handwriting data. To synchronize the handwriting data, there is a need for an eraser with which the coordinate detector 11 is able to recognize the coordinates.

Figure 13A:
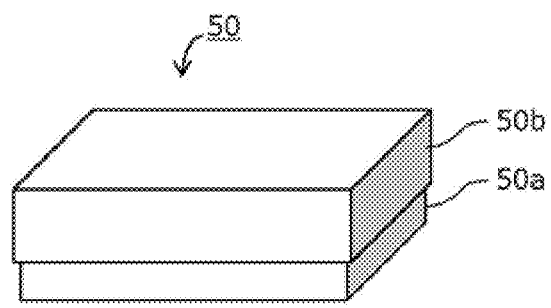
FIGS. 13A to 13C are explanatory diagrams that illustrate the external appearance of an eraser according to a fifth embodiment of the present invention.
Figure 13B:
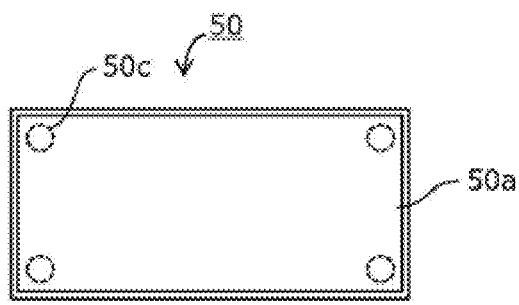
Figure 13C:
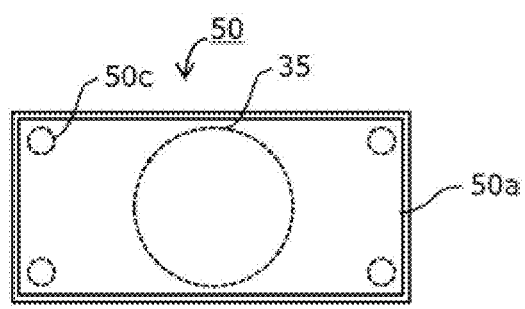

FIGS. 13A to 13C are explanatory diagrams that illustrate a configuration of an eraser according to the fifth embodiment. As illustrated in FIG. 13A, an eraser 50 includes an erasing part 50a and a gripping part 50b. The erasing part 50a includes, as its core material, a cuboid elastic member having the surface thereof covered with raised fibers. The external appearance and the material of the surface thereof are the same as those of a conventional whiteboard eraser.

The eraser 50 is different from the conventional eraser in that dielectrics 50c detectable by the coordinate detector 11 are provided on at least four corners of the core material on the lower surface (see FIG. 13B) of the erasing part 50a. The dielectrics 50c are disposed such that the coordinate detector 11 recognizes the positions of the four corners of the erasing part 50a when the lower surface of the eraser 50 is in contact with the board 10. A metallic body may be used instead of the dielectric if it is detectable by the coordinate detector 11.

As a capacitive touch panel enables what is called multi-touch detection, it is able to detect the position of each of the dielectrics 50c disposed at the four corners of the eraser 50. For example, in a case where the coordinate detector 11 simultaneously detects the position coordinates at the four points within a predetermined area, it may be determined that it is neither the pen 30 nor the finger but the eraser 50. In this manner, the eraser 50 may be discriminated from the pen 30 or the finger.

When the eraser 50 is recognized and it is detected that the positions of the four dielectrics 50c have moved on the board 10, the handwriting data is erased within the moving range of the rectangular region connecting the position coordinates of the four dielectrics 50c in straight lines. By this process, it is possible to erase the corresponding part of the handwriting data in synchronization with the removal of the handwriting on the writing area 18.

As illustrated in FIG. 13C, the identifier 34 may be attached to the eraser 50 in addition to the dielectrics 50c. For example, the resonance circuit 35, which is an identification circuit, is disposed in the elastic member of the eraser 50. As the eraser 50 has the unique resonance frequency f0 different from that of the pen 30, it is ensured that the pen 30 or the finger and the eraser 50 may be discriminated with the identification signal.

On the conventional whiteboards, a user often rubs the whiteboard with their fingers to erase the handwriting without using an eraser. This is because it is easier to erase the handwriting with fingers in a small area.

As the coordinate detector 11 is a capacitive touch panel, it is able to detect the touch with a finger that is a dielectric. Furthermore, it is possible to distinguish between the finger and the pen 30 based on a difference in the level of the capacitance. Fingers and the eraser 50 may be also distinguished.

Thus, it is possible to erase the corresponding part of the handwriting data in synchronization with the operation to erase the handwriting with a finger.

In the same manner as for the pen 30, the controller 20 may determine the state of the eraser 50 and notify the user of the information corresponding to the determination result. Specifically, the controller 20 (the first pen-state determiner 22) determines whether the eraser 50 is in a state where the coordinate detector 11 is able to detect the position coordinates. The controller 20 (the second pen-state determiner 23) determines whether the eraser 50 is in a state where the pen identifying part 12 is able to identify the attribute. Here, the attribute is the information indicating an eraser. That is, the attribute of the eraser 50 is an example of the attribute of an input tool according to the present invention.

The controller 20 (the notifier 24) performs a notification process to notify predetermined information based on the determination results of the first pen-state determiner 22 and the second pen-state determiner 23. This allows the user to know that the identifier 34 is left unattached to the eraser 50, the identifier 34 corresponding to the pen 30 is attached to the eraser 50, the removal of the handwriting by the eraser 50 is not properly processed, etc.

In the touch input system 100, an input process may be performed by switching the input mode of input (writing) with the pen 30, the input mode of input (removal of handwriting) with the eraser 50, the input mode with other input tools (brush, or the like), etc. For example, any one of multiple types of input modes (pen input mode, eraser input mode, brush input mode, etc.) is assigned to each input tool (the pen 30, the eraser 50, the brush, etc.). In this case, the attribute is information on the input mode assigned to each input tool. Thus, the touch input system 100 performs an input process in the input mode identified by the pen identifying part 12. This makes it possible to properly identify multiple types of input tools when the types of input tools are used in combination.

Sixth Embodiment

As a modification of the configuration of the board 10 described in the first embodiment, it is possible to implement an embodiment in which an induction coil is provided separately from the X parallel electrode 13x. In this case, the loop changeover circuit 16 described in the first embodiment is eliminated, and the X parallel electrode 13x and the X-detection drive circuit 14x are components for the coordinate detector 11.

Apart from them, an electrode of the induction coil and a drive circuit are components for the pen identifying part 12. The detection of the induction coil is executed by the X detection circuit 15x described in the first embodiment.

The induction coil according to the sixth embodiment is embedded at a depth different from any of the X parallel electrodes 13x and the Y parallel electrodes 13y. Thus, it is not in contact with any of the X parallel electrodes 13x and the Y parallel electrodes 13y.

A preferred embodiment of the present invention also includes a combination of any of the above-described embodiments.

As described above, based on the attribute regarding the input tool including various writing tools capable of writing on the input screen (the board 10), e.g., a pen such as a marker pen or an electronic pen, an eraser, or a brush, the touch input system 100 according to the embodiment of the present invention determines the type of the input tool (the color of the pen 30, the thickness of the pen tip 33, the shape of the pen tip 33, the pen, the eraser, the brush, or the like). The touch input system 100 determines the state of the input tool and, when some problem occurs in the input tool, notifies the user of the faulty state of the input tool. This makes it possible to prevent a situation where, for example, the user writes on the input screen without being aware of the faulty state of the electronic pen. As described above, with the touch input system 100, it is possible to determine the type of input tool, determine the state of the input tool, and notify the user of the state of the input tool.

In addition to the above-described embodiments, there may be various modifications of the present invention. It should be understood that the modifications are included in the range of the present invention. The present invention should include equivalents of the scope of claims and all modifications within the scope of claims.

DESCRIPTION OF REFERENCE NUMERALS

10: Board
11: Coordinate detector
12: Pen identifying part
13x: X parallel electrode
13y: Y parallel electrode
14x: X-detection drive circuit
15x: X detection circuit
15y: Y detection circuit
16: Loop changeover circuit
17: Inductive-signal output circuit
19: Resonance detection circuit
20: Controller
22: First pen-state determiner
23: Second pen-state determiner
24: Notifier
25: Changeover processor
30: Pen
34: Identifier
35: Resonance circuit
36: Ink supplier
40: Handwriting
50: Eraser
62: Indicator

What is claimed is:

1. A touch input system for input to an input screen for touch input with an input tool, the touch input system comprising:
    coordinate detection circuitry that detects a position coordinate of a touch with the input tool on the input screen;
    input-tool identifying circuitry that identifies an attribute regarding the input tool;
    first input-tool state determination circuitry that determines whether the input tool is in a state where the coordinate detection circuitry is able to detect the position coordinate;
    second input-tool state determination circuitry that determines whether the input tool is in a state where the input-tool identifying circuitry is able to identify the attribute; and
    notification circuitry that notifies predetermined information based on determination results of the first input-tool state determination circuitry and the second input-tool state determination circuitry, wherein
    the input tool is a pen,
    the coordinate detection circuitry detects a change in capacitance at an area of contact between the input screen and an ink-impregnated pen tip of the pen or at a handwriting area where the ink is applied to the input screen due to the contact so as to detect the position coordinate, and
    in a case where the first input-tool state determination circuitry determines that the pen is in a state where the coordinate detection circuitry is not able to detect the position coordinate, the notification circuitry notifies information indicating that an amount of the ink is insufficient.

2. The touch input system according to claim 1, wherein the input tool is configured to have an identification-signal output circuit attached thereto, the identification-signal output circuit outputting an identification signal allowing the input-tool identifying circuitry to identify the attribute.

3. The touch input system according to claim 2, wherein
    the identification-signal output circuit is a resonance circuit having a unique resonance frequency,
    the input-tool identifying circuitry includes
        an inductive-signal output circuit that outputs an inductive signal to the resonance circuit; and
        a resonance detection circuit that detects resonance induced in the resonance circuit due to the inductive signal, and the input-tool identifying circuitry outputs the inductive signals at multiple frequencies by using the inductive-signal output circuit, determines presence or absence of resonance with regard to the inductive signal at each of the frequencies to detect the resonance frequency of the resonance circuit, and identifies the attribute that is previously defined corresponding to the detected resonance frequency.

4. The touch input system according to claim 2, wherein, in a case where the second input-tool state determination circuitry determines that the input tool is in a state where the input-tool identifying circuitry is not able to identify the attribute, the notification circuitry notifies information indicating that the identification-signal output circuit is not attached to the input tool.

5. The touch input system according to claim 1, further comprising a changeover processor that alternately makes a changeover between a coordinate detection process of the coordinate detection circuitry and an attribute identification process of the input-tool identifying circuitry, wherein
the first input-tool state determination circuitry performs a determination process each time the coordinate detection process is performed, and the second input-tool state determination circuitry performs a determination process each time the attribute identification process is performed.

6. The touch input system according to claim 1, wherein
in a case where the first input-tool state determination circuitry determines that the input tool is in a state where the coordinate detection circuitry is able to detect the position coordinate and the second input-tool state determination circuitry determines that the input tool is in a state where the input-tool identifying circuitry is not able to identify the attribute, the notification circuitry notifies first information indicating that the input tool is faulty, and
in a case where the first input-tool state determination circuitry determines that the input tool is in a state where the coordinate detection circuitry is not able to detect the position coordinate and the second input-tool state determination circuitry determines that the input tool is in a state where the input-tool identifying circuitry is able to identify the attribute, the notification circuitry notifies second information indicating that the input tool is faulty.

7. The touch input system according to claim 1, wherein, in a case where the first input-tool state determination circuitry determines that the input tool is in a state where the coordinate detection circuitry is not able to detect the position coordinate and the second input-tool state determination circuitry determines that the input tool is in a state where the input-tool identifying circuitry is not able to identify the attribute, the notification circuitry notifies third information indicating that the input tool is faulty.

8. The touch input system according to claim 1, wherein, in a case where the first input-tool state determiner determination circuitry determines that the input tool is in a state where the coordinate detection circuitry is able to detect the position coordinate and the second input-tool state determination circuitry determines that the input tool is in a state where the input-tool identifying circuitry is able to identify the attribute, the notification circuitry notifies fourth information indicating that the input tool is normal.

9. The touch input system according to claim 1, wherein any one of multiple types of input modes is assigned to the input tool,
the attribute is information on the input mode assigned to the input tool, and
input is given in the input mode identified by the input-tool identifying circuitry.

10. The touch input system according to claim 1, wherein
the input tool is a pen, and
the attribute is information that is at least any one of a color input by the pen, a thickness of a pen tip of the pen, and a shape of a pen tip of the pen.

11. A touch input system for input to an input screen for touch input with an input tool, the touch input system comprising:
coordinate detection circuitry that detects a position coordinate of a touch with the input tool on the input screen;
input-tool identifying circuitry that identifies an attribute regarding the input tool;
first input-tool state determination circuitry that determines whether the input tool is in a state where the coordinate detection circuitry is able to detect the position coordinate;
second input-tool state determination circuitry that determines whether the input tool is in a state where the input-tool identifying circuitry is able to identify the attribute;
notification circuitry that notifies predetermined information based on determination results of the first input-tool state determination circuitry and the second input-tool state determination circuitry; and
a changeover processor that alternately makes a changeover between a coordinate detection process of the coordinate detection circuitry and an attribute identification process of the input-tool identifying circuitry, wherein
the first input-tool state determination circuitry performs a determination process each time the coordinate detection process is performed, and the second input-tool state determination circuitry performs a determination process each time the attribute identification process is performed.

12. The touch input system according to claim 11, wherein the input tool is configured to have an identification-signal output circuit attached thereto, the identification-signal output circuit outputting an identification signal allowing the input-tool identifying circuitry to identify the attribute.

13. The touch input system according to claim 12, wherein
the identification-signal output circuit is a resonance circuit having a unique resonance frequency,
the input-tool identifying circuitry includes
an inductive-signal output circuit that outputs an inductive signal to the resonance circuit; and
a resonance detection circuit that detects resonance induced in the resonance circuit due to the inductive signal, and
the input-tool identifying circuitry outputs the inductive signals at multiple frequencies by using the inductive-signal output circuit, determines presence or absence of resonance with regard to the inductive signal at each of the frequencies to detect the resonance frequency of the resonance circuit, and identifies the attribute that is previously defined corresponding to the detected resonance frequency.

14. The touch input system according to claim 12, wherein, in a case where the second input-tool state determination circuitry determines that the input tool is in a state where the input-tool identifying circuitry is not able to identify the attribute, the notification circuitry notifies information indicating that the identification-signal output circuit is not attached to the input tool.

15. The touch input system according to claim 11, wherein
in a case where the first input-tool state determination circuitry determines that the input tool is in a state where the coordinate detection circuitry is able to detect the position coordinate and the second input-tool state determination circuitry determines that the input tool is in a state where the input-tool identifying circuitry is not able to identify the attribute, the notification circuitry notifies first information indicating that the input tool is faulty, and
in a case where the first input-tool state determination circuitry determines that the input tool is in a state where the coordinate detection circuitry is not able to detect the position coordinate and the second input-tool state determination circuitry determines that the input tool is in a state where the input-tool identifying circuitry is able to identify the attribute, the notification circuitry notifies second information indicating that the input tool is faulty.

16. The touch input system according to claim 11, wherein, in a case where the first input-tool state determination circuitry determines that the input tool is in a state where the coordinate detection circuitry is not able to detect the position coordinate and the second input-tool state determination circuitry determines that the input tool is in a state where the input-tool identifying circuitry is not able to identify the attribute, the notification circuitry notifies third information indicating that the input tool is faulty.

17. The touch input system according to claim 11, wherein, in a case where the first input-tool state determination circuitry determines that the input tool is in a state where the coordinate detection circuitry is able to detect the position coordinate and the second input-tool state determination circuitry determines that the input tool is in a state where the input-tool identifying circuitry is able to identify the attribute, the notification circuitry notifies fourth information indicating that the input tool is normal.

18. The touch input system according to claim 11, wherein
any one of multiple types of input modes is assigned to the input tool,
the attribute is information on the input mode assigned to the input tool, and
input is given in the input mode identified by the input-tool identifying circuitry.

19. The touch input system according to claim 11, wherein the input tool is a pen, and
the attribute is information that is at least any one of a color input by the pen, a thickness of a pen tip of the pen, and a shape of a pen tip of the pen.

20. A touch input system for input to an input screen for touch input with an input tool, the touch input system comprising:
coordinate detection circuitry that detects a position coordinate of a touch with the input tool on the input screen;
input-tool identifying circuitry that identifies an attribute regarding the input tool;
first input-tool state determination circuitry that determines whether the input tool is in a state where the coordinate detection circuitry is able to detect the position coordinate;
second input-tool state determination circuitry that determines whether the input tool is in a state where the input-tool identifying circuitry is able to identify the attribute; and
notification circuitry that notifies predetermined information based on determination results of the first input-tool state determination circuitry and the second input-tool state determination circuitry, wherein
in a case where the first input-tool state determination circuitry determines that the input tool is in a state where the coordinate detection circuitry is able to detect the position coordinate and the second input-tool state determination circuitry determines that the input tool is in a state where the input-tool identifying circuitry is not able to identify the attribute, the notification circuitry notifies first information indicating that the input tool is faulty, and
in a case where the first input-tool state determination circuitry determines that the input tool is in a state where the coordinate detection circuitry is not able to detect the position coordinate and the second input-tool state determination circuitry determines that the input tool is in a state where the input-tool identifying circuitry is able to identify the attribute, the notification circuitry notifies second information indicating that the input tool is faulty.

\* \* \* \* \*